(12) United States Patent
Baitz et al.

(10) Patent No.: US 7,191,948 B1
(45) Date of Patent: Mar. 20, 2007

(54) TERMINAL FOR TREATING FORMS

(75) Inventors: Günter Baitz, Berlin (DE); Hartmut Kamin, Berlin (DE); Joachim Burchart, Schlangen (DE)

(73) Assignee: Wincor Nixdorf GmbH & Co. KG, Paderborn (DE)

( * ) Notice: Subject to any disclaimer, the term of this patent is extended or adjusted under 35 U.S.C. 154(b) by 1266 days.

(21) Appl. No.: 10/088,789

(22) PCT Filed: Sep. 13, 2000

(86) PCT No.: PCT/DE00/03179

§ 371 (c)(1),
(2), (4) Date: Mar. 21, 2002

(87) PCT Pub. No.: WO01/24119

PCT Pub. Date: Apr. 5, 2001

(30) Foreign Application Priority Data

Sep. 24, 1999 (DE) .............................. 199 45 834

(51) Int. Cl.
*G06K 7/10* (2006.01)
(52) U.S. Cl. .................. 235/462.43; 235/435; 235/475
(58) Field of Classification Search ................ 235/435, 235/475, 462.43, 462.44
See application file for complete search history.

(56) References Cited

U.S. PATENT DOCUMENTS 5,156,397 A   10/1992   Valenza, Jr. ................. 273/138
5,939,694 A * 8/1999   Holcomb et al. ........... 235/381
6,062,477 A * 5/2000   Wike et al. ............ 235/462.43

FOREIGN PATENT DOCUMENTS

| DE | 87 11 758.4 | 11/1987 |
| DE | 37 41 704 A1 | 6/1989 |
| DE | 41 22 708 A1 | 12/1992 |
| FR | 2 714 752 | 7/1995 |
| WO | 95/24679 | 9/1995 |
| WO | 98/41073 | 9/1998 |

* cited by examiner

*Primary Examiner*—Seung Ho Lee
(74) *Attorney, Agent, or Firm*—Michaud-Duffy Group LLP

(57) ABSTRACT

A self service bank terminal is constructed so as to be usable by sitting and standing customers, so as to take up little floor surface, and so that several terminals can be placed side-by-side with the display screen of one terminal being not viewable by customers at other of the terminals. The terminal has a housing 10 with two rectangular side walls 23, 123 connected by an upper cover plate 24, a rear wall 25, a front plate 27 and a bottom plate 26, which includes the bottom plate having a supporting surface for engaging a supporting floor, or the bottom plate 22 having a supporting column 21, with the cover plate being horizontal or slightly sloped. The display screen is located on a pulpit shaped portion 124 of the cover plate, has associated with it blinder shields 41 on three of its sides, and is slightly inclined. Also included in the terminal are a keyboard 52, a check examining device 53, and a printer drawer 30.

9 Claims, 3 Drawing Sheets

TERMINAL FOR TREATING FORMS

TECHNICAL FIELD

The invention relates to a terminal for processing forms, in particular betting slips.

PRIOR ART

A terminal of the aforementioned type is offered and marketed by the applicant under the designation "XION" and, in side view, has approximately the shape of a semi-ellipse inclined rearward. A slot-like feed opening for documents is arranged on the vertex of the semi-ellipse. On the operator side, underneath the feed opening, there is a visual display unit inclined rearward in the manner of a desk and having a touch-sensitive input surface and, under the latter, a receiving compartment for documents which have passed through a document reader incorporated in the terminal behind the visual display unit. Underneath the receiving compartment, the operating side of a PC-based control device is always accessible.

The aforementioned terminal has various disadvantages: In order to insert a document into the feed opening, it is necessary to reach over the visual display unit. As a result, the operation of the terminal is made more difficult, in particular for small persons.

In the case of a document jam, the visual display unit must be disassembled.

The operating side of the control device, and therefore its operating elements are not protected against unauthorized access.

WO 9841073 A1 discloses a device having a first mounting rack and a further mounting rack that can be coupled thereto. The further mounting rack is designed as a peripheral top unit and is fixed to the mounting rack in a detachable and swiveling manner.

The object of the invention is to propose a terminal of the aforementioned type which is simple to operate, to install and to maintain and whose operating elements, to be operated only by operating staff, are protected against unauthorized access.

The object is achieved by the features of claim 1.

SUMMARY OF THE INVENTION

The invention is based on the finding that a terminal for processing forms can be operated particularly simply when at least the components to be operated regularly are located close beside one another on a circular arc about the shoulder joint of an operator. In the case of a terminal of the aforementioned type, these are the document feed opening and the touch-sensitive input surface of the visual display unit, but in the further sense also the operating elements of the electronic box. According to the invention, for this purpose a stand having a foot part and a loadbearing part projecting approximately perpendicularly from the latter is provided to hold the visual display unit, and the document reader is arranged on an operator side of the terminal, underneath the visual display unit. For simple installation and maintenance of the hardware and software of the terminal, the document reader can be displaced in the direction of an operator between a position in which it rests on the loadbearing part and a position at a distance from the latter.

The document reader is preferably fixed to at least one pull-out rail, which is mounted so that it can slide on the stand.

As an alternative to this, the document reader can be fixed to a document reader wall, which substantially covers the operator side of the loadbearing part when the document reader is resting on the latter and is fixed to at least one pull-out rail, which in turn is mounted such that it can slide on the stand.

According to a preferred embodiment of the invention, an at least partly hollow plate is arranged on the foot part, and during displacement of the document reader in the direction of the loadbearing part, the at least one pull-out rail is accommodated by the plate.

The electronic box is preferably set up or fixed on the plate or a part of the area of the foot part which—as seen from the operator side—is located behind the loadbearing part. In this case, the electronic box is arranged on the foot part in such a way that its operating side rests on the loadbearing part, the loadbearing part being provided with at least one section which leaves the operating elements of the electronic box free. Then, when the document reader is resting on the loadbearing part, the operating side is then covered by said document reader or the document reader wall and is therefore removed from unauthorized access. In the position at a distance from the loadbearing part, the operating side of the electronic box is exposed for access to the operating elements.

In order to improve the access protection still further, in a preferred development of the invention the loadbearing part is designed in the manner of a frame, the frame reaching around at least one region of the electronic box close to its operating side.

An electric line connecting the electronic box to the document reader and/or to the visual display unit may be led through the loadbearing part or else additionally through the plate, forming a pull-out loop.

Behind the visual display unit, a document printer may be set up on the electronic box. In order to be able to grip sales receipts printed by the latter from the operator side of the terminal, according to a development of the invention the visual display unit can be displaced laterally or pivoted laterally on the loadbearing part.

In the following text, two exemplary embodiments of the invention will be explained by using the appended drawings.

DESCRIPTION OF ONE EMBODIMENT OF THE INVENTION

Figure 1:
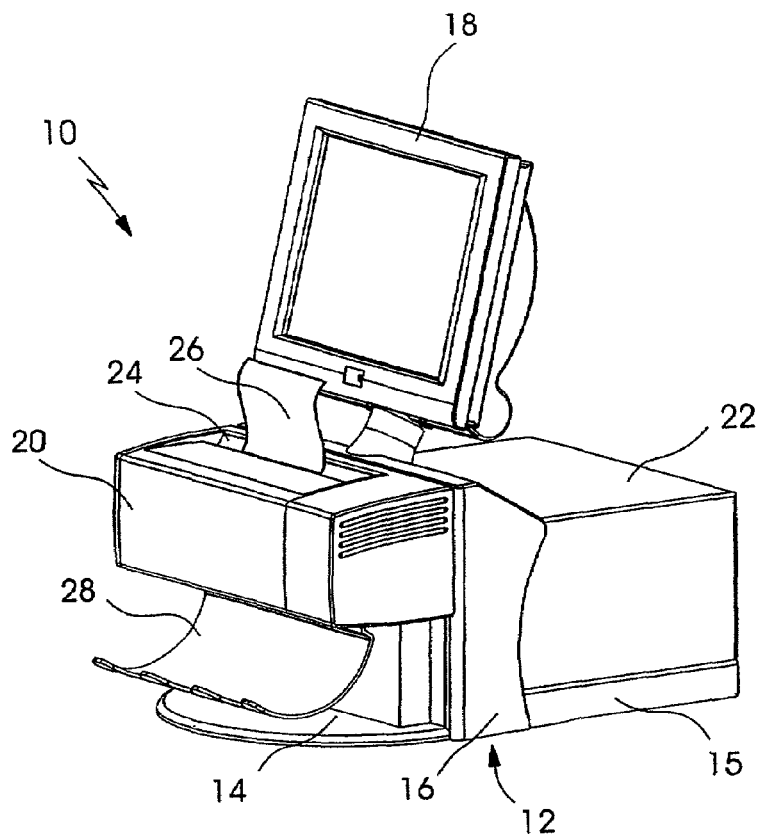
FIG. 1 shows a first exemplary embodiment of a terminal for processing forms in a perspective side view.

FIG. 1 shows a first exemplary embodiment of a terminal 10 for processing forms or documents 26, in a perspective side view. It comprises a stand 12 having a foot part 14, 14' and a loadbearing part 16, a visual display unit 18 having a touch-sensitive input surface, a touch screen, as it is known, a document reader 20 and an electronic box 22, in which a terminal control device is accommodated. At the top, the document reader 20 has a feed opening 24 for documents 26 to be processed and, at the bottom, a receiving compartment 28 for documents which have passed through the document reader 20.

The document reader 20 is fitted to the upper edge of a document reader wall 30, on the operator side 32 of the latter. From the right-hand and left-hand lower corner of the rear side of the document reader wall 30, in each case a sliding rail 34 projects perpendicularly (only the right-hand sliding rail can be seen in FIG. 2). The sliding rails 34 are mounted, in a manner which is known and therefore not illustrated, so that they can slide in a hollow plate 15 arranged behind the loadbearing part 16 on the rear foot part 14', in such a way that the document reader wall 30 can be displaced in the direction of an operator between a position (FIG. 1) resting on the loadbearing part 16 and a position (FIG. 2) at a distance from the latter. The document reader wall 30 substantially covers the operator side 36 of the loadbearing part 16 when it is in its position resting on the latter.

The electronic box 22 is arranged on the plate 15 in such a way that its operating side 38 faces the loadbearing part 16. In the region of the operating side 38 of the electronic box 22, the loadbearing part 16 is provided with a cutout 40 which leaves operating elements—for example an "on" pushbutton 42 and a data medium reader 42'—belonging to the electronic box 22 and arranged on the operating side 38 free for access. A cable lead-through 44 in the loadbearing part 16 opens in the cavity in the plate 15.

Figure 3:
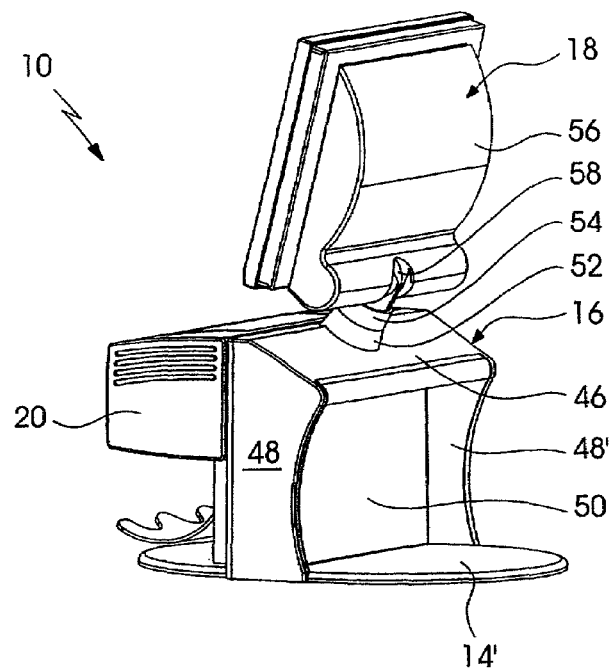
FIG. 3 shows the terminal from FIG. 1 in a perspective rear view.

FIG. 3 shows the terminal 10 in a perspective rear view. In this, it can be seen that the loadbearing part 16 is constructed in the manner of a frame with upper and lateral frame parts 46, 48, 48' pointing away from its operator side 36. The holding space 50 bounded by the frame parts 46, 48, 48' and the rear foot part 14' is dimensioned such that it is able to accommodate the region of the electronic box 22 and of the plate 15 that is close to the operating side 38 with a slight lateral spacing.

From the upper frame part 46, a bush 52 projects upward in order to hold a shaft 54 fitted to the bottom of the visual display unit 18. The shaft 54 ends in a tilting joint 58 which is arranged in the lower region of the visual display unit housing 56 and which permits the angle of inclination of the visual display unit 18 to be adjusted with respect to the loadbearing part 16.

Figure 2:
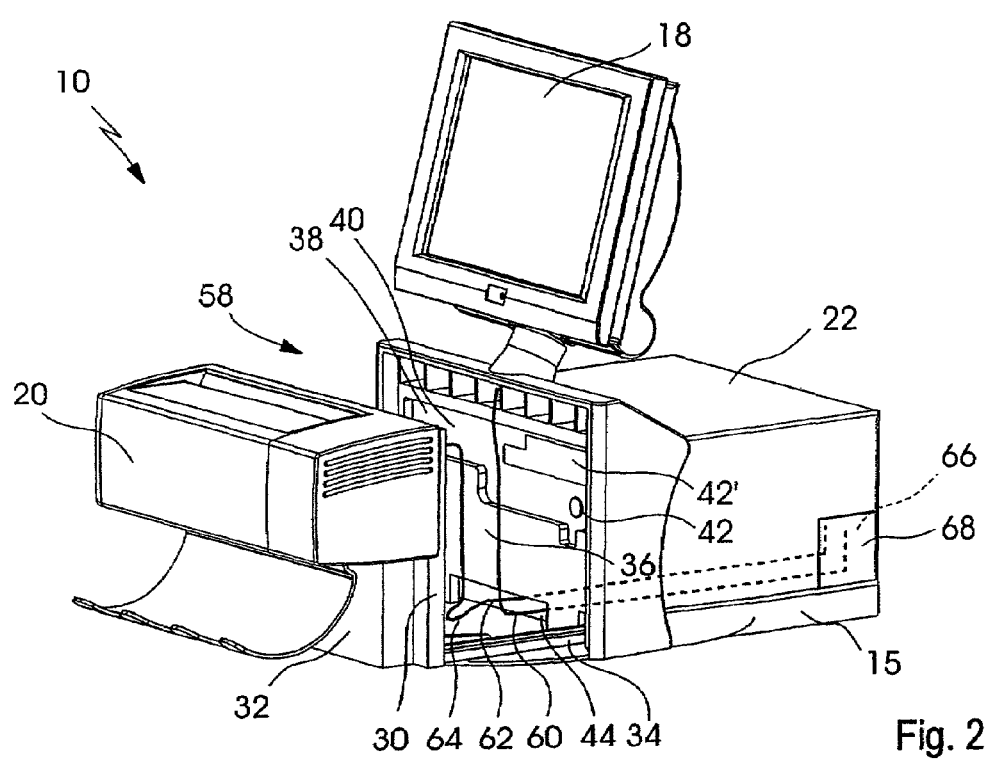
FIG. 2 shows the terminal from FIG. 1 with a document reader at a distance from the loadbearing part.

FIG. 2 shows the document reader wall 30 in a position at a distance from the loadbearing part 12. As a result, a marshalling space 58 between the two becomes free for an electric line 60 that connects the electronic box 22 to the visual display unit 18 and a second electric line 62 that connects the electronic box 22 to the document reader 20. The latter line is inserted into the plate 15 while forming a pull-out loop 64. Both lines 60, 62 lead through the plate 15 to a cable connection space 66 belonging to the electronic box 22, which is covered by a removable cover 68.

For the purpose of installation of the terminal 10, the document reader wall 30 is moved into the position illustrated in FIG. 2 and at a distance from the loadbearing part 12. The lines 60, 62 are then threaded in and connected to the electronic box 22 and to the visual display unit 18 and to the document reader 20. Then, the "on" pushbutton 42 is operated and a data medium (not illustrated) is inserted into the data medium reader 42'. Then, or at the latest following the reading and the removal of the data medium, the document reader wall 30 is moved into the position illustrated in FIG. 1 and resting on the loadbearing part 12; the terminal 10 is ready to operate.

If a document 26, for example a betting slip or a lottery slip, is then inserted into the feed opening 24, then it will be read by the document reader 20 and deposited in the receiving compartment 28. The information read, the marked lottery numbers in the example, will be displayed on the visual display unit 18.

Any inputs, for example a confirmation, calling up an amount to be charged or paid out, are actuated by touching input fields depicted on the touch screen.

Figure 4:
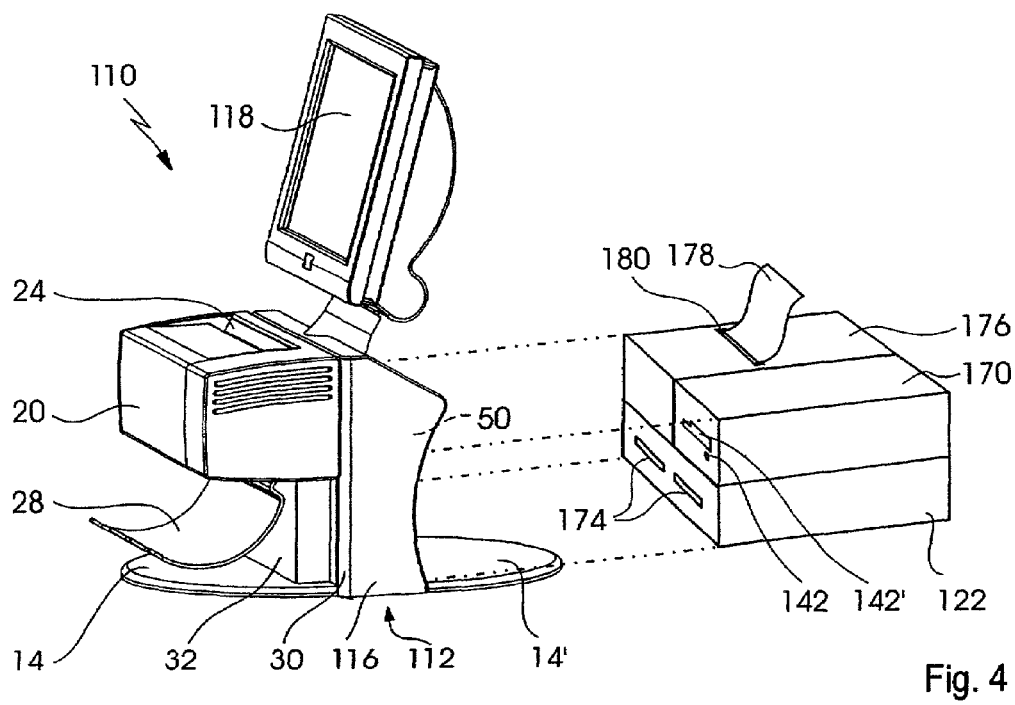
FIG. 4 shows a second exemplary embodiment of a terminal for processing forms in a perspective side view.

FIG. 4 shows a terminal 110 for processing forms according to a second exemplary embodiment of the invention, in a perspective side view. Like the terminal 10 according to the first exemplary embodiment—for which reason identical parts are provided with identical reference symbols—it comprises a stand 112 having a foot part 14, 14' and a loadbearing part 116, a second visual display unit 118 with a touch-sensitive input area, a touch screen, as it is known, a document reader 20 and a second electronic box 122, in which a terminal control device is accommodated. At the top, the document reader 20 has a feed opening 24 for documents to be processed and, at the bottom, a receiving compartment 28 for documents which have passed through the document reader 20. The document reader 20 is fitted to the upper edge of a document reader wall 30, on its operating side 32.

The second electronic box 122 is of particular flat design. The second electronic box 122 is equipped with an additional housing 170, corresponding to the device disclosed by WO 9841073 A1, in which a second "on" pushbutton 142 and a second data medium reader 142' are accommodated. The additional housing 170 is detachably and pivotably fixed to the second electronic box 122, specifically in such a way that connecting plugs 174 arranged on the connection side 172 of the second electronic box 122 and intended for cables leading to the visual display unit 118 and to the document reader 20 project into the holding space 50 of the stand 12. It is therefore possible to omit a hollow plate for guiding the cables, which is designated by 15 in the case of the terminal 10 according to the first exemplary embodiment. The second "on" pushbutton 142 and the second data medium reader 142' are again associated with the cutout 40 in the loadbearing part 16 (FIG. 2) in the selected arrangement of the additional housing 170.

Figure 5:
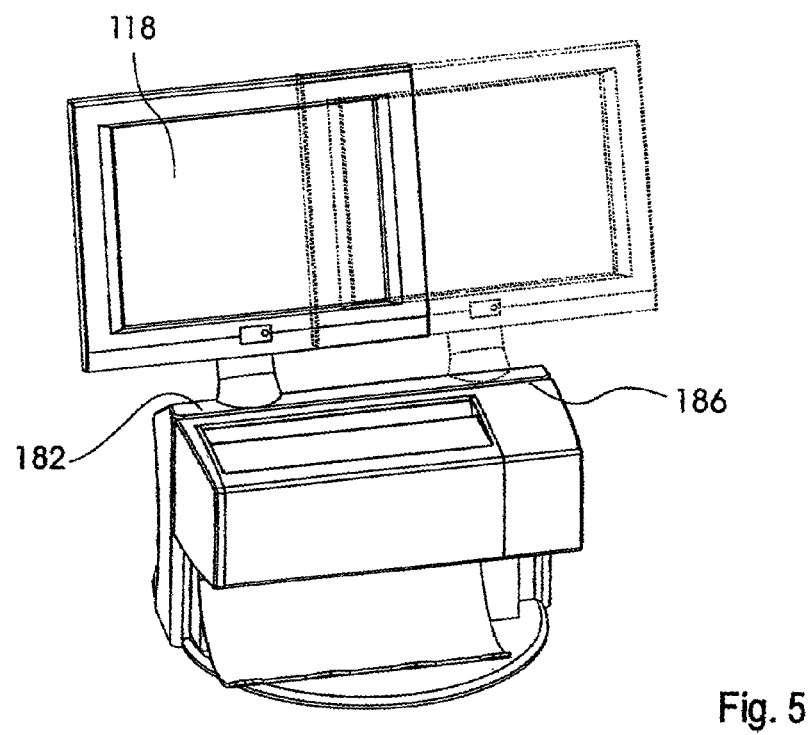
FIG. 5 shows the terminal from FIG. 4 in a perspective front view.
Figure 6:
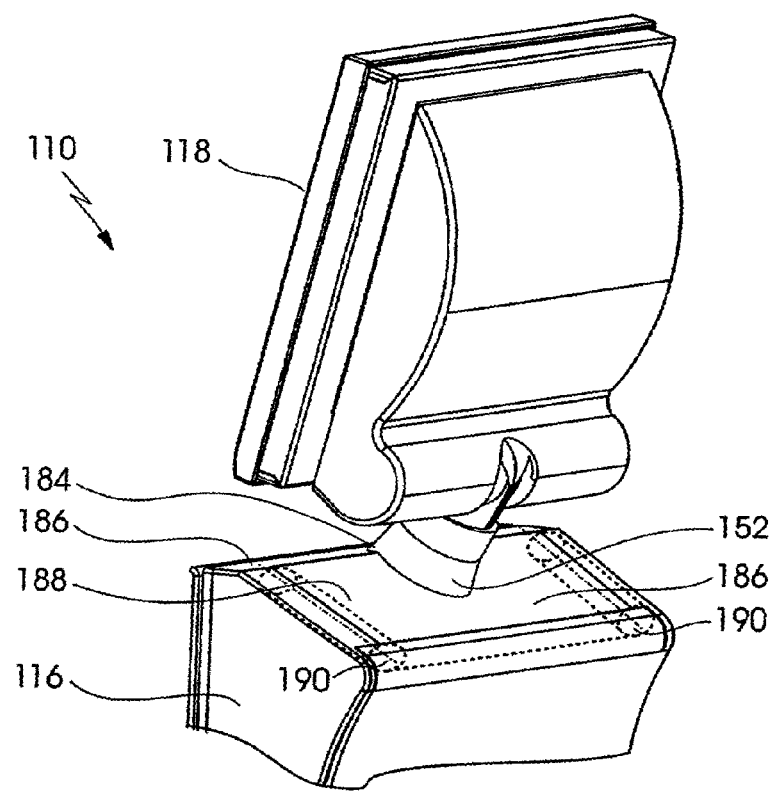
FIG. 6 shows the terminal from FIG. 4 in a perspective rear view.

FIG. 4 reveals that the additional housing 170 is significantly narrower than the second electronic box 122. The remaining space on the second electronic box 122 is occupied by a document printer 176, which is able to output a document, for example a sales receipt 178, through an output slot 180. The latter is arranged on the upper side of the document printer 176 in such a way that the sales receipt 178 can be gripped both from the operating side and from a customer side of the terminal 110. In order to permit operating personnel to have access to the sales receipt 178, the second visual display unit 118 can be displaced laterally on the upper side 182 of the loadbearing part 116 of the second terminal 110 (FIG. 5).

For this purpose, the holding bush 152 bears a retaining projection 184, which is guided in a guide slot 186. The upper side 182 is provided with a cutout 186, in which the holding bush 152 can slide. That part of the section 186 which is left free by the holding bush 152 is covered by an endless thin sheet web which is led around two rotatable transport rollers 190 arranged parallel to the sides of the cutout 186. The cutout 186 is therefore covered in a dust-tight manner in every position of the visual display unit 118.

According to an alternative configuration of the terminal 10, the visual display unit 18 is arranged such that it can be pivoted laterally on the upper frame part 46 of the loadbearing part 16. For this purpose, a hollow swinging arm angled over in the manner of a crank is inserted between the holding bush 52 and the shaft 54 of the visual display unit 18, a first leg of the crank being rotatably mounted in the holding bush 52, and the shaft 54 of the visual display unit 18 being rotatably mounted in the other leg of the crank.

The invention claimed is:

1. A terminal (10, 110) for processing forms (26), in particular betting slips, comprising a document reader (20) with a receiving compartment (28) for documents which have passed through the document reader (20), a visual display unit (18, 118) with a touch-sensitive input area and an electronic box (22, 122) containing a terminal control device,
   characterized in that,
   a stand (12, 112) is provided with a foot part (14, 14') and a loadbearing part (16, 116) projecting approximately perpendicularly from the latter to hold the visual display unit (18, 118) and
   the document reader (20) can be displaced on a lacuna arranged on an operator side of the terminal (10, 110) underneath the visual display unit (18, 118) and, in the direction of an operator, between a position resting on the loadbearing part (16, 116) and a position at a distance from the latter.

2. The terminal (10) as claimed in claim 1, whose document reader (20) is fixed to at least one pull-out rail which is mounted such that it can slide on the stand (12).

3. The terminal (10) as claimed in claim 1, whose document reader (20) is fixed to a document reader wall (30), which substantially covers the operator side (36) of the loadbearing part (16) when the document reader (20) is resting on the latter and is fixed to at least one pull-out rail (34), which in turn is mounted such that it can slide on the stand (12).

4. The terminal (10) as claimed in claim 2, having an at least partly hollow plate (15) which is arranged on the rear part (14') of the foot part and in which the at least one pullout rail (34) is accommodated by the plate (15) when the document reader (20) is displaced in the direction of the loadbearing part (16).

5. The terminal (10, 110) as claimed in claim 1, in which the electronic box (22, 122) is set up on or fixed to the plate (15) or—as viewed from the operator side—a section (14') of the area of the foot part which is located behind the loadbearing part.

6. The terminal (10, 110) as claimed in claim 5, whose electronic box (22, 122) is arranged on the foot part (14') or the plate (15) in such a way that its operating side (38) rests on the loadbearing part (16, 116), the loadbearing part (16) being provided with at least one cutout (40) that leaves the operating elements (42, 42'; 142, 142') of the electronic box (22; 122) free.

7. The terminal (10, 110) as claimed in claim 6, whose loadbearing part (16) is constructed in the manner of a frame, the frame reaching around at least one region of the electronic box (22, 122) that is close to its operating side.

8. The terminal (10, 110) as claimed in claim 1, in which an electric line (62, 60) connecting the electronic box (22) to the document reader (20) and/or an electric line (62, 60) connecting to the visual display unit (18) is led through the day part (16) or else additionally through the plate (15), forming a pull-out loop (64).

9. The terminal (110) as claimed in claim 1 whose visual display unit (118) can be displaced laterally or pivoted laterally on the loadbearing part (116).

\* \* \* \* \*

UNITED STATES PATENT AND TRADEMARK OFFICE
CERTIFICATE OF CORRECTION

PATENT NO. : 7,191,948 B1 Page 1 of 1
APPLICATION NO. : 10/088789
DATED : March 20, 2007
INVENTOR(S) : Günter Baitz et al.

It is certified that error appears in the above-identified patent and that said Letters Patent is hereby corrected as shown below:

On Title page
Item 73
IN THE ASSIGNEE:
Please delete "Wincor Nixdorf GmbH & Co. KG" and substitute --Wincor Nixdorf International GmbH--.

Signed and Sealed this

Nineteenth Day of February, 2008

JON W. DUDAS
*Director of the United States Patent and Trademark Office*